(12) United States Patent
Lee et al.

(10) Patent No.: US 7,791,298 B2
(45) Date of Patent: Sep. 7, 2010

(54) MOTOR DRIVER SYSTEM AND METHOD FOR PROTECTING MOTOR DRIVER

(75) Inventors: Kyung Hoon Lee, Seoul (KR); June Hee Won, Seoul (KR); Gil Su Lee, Seoul (KR); Jun Ho Ahn, Seoul (KR); Jae Yoon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 407 days.

(21) Appl. No.: 11/945,890

(22) Filed: Nov. 27, 2007

(65) Prior Publication Data

US 2008/0297085 A1 Dec. 4, 2008

(30) Foreign Application Priority Data

May 29, 2007 (KR) .................. 10-2007-0052270

(51) Int. Cl.
*H02K 17/32* (2006.01)
*H02K 23/68* (2006.01)
*H02K 27/30* (2006.01)

(52) U.S. Cl. ............... 318/434; 318/432; 318/433; 318/449

(58) Field of Classification Search ......... 318/432–434, 318/449
See application file for complete search history.

(56) References Cited

U.S. PATENT DOCUMENTS

| | | | |
|---|---|---|---|
| 6,696,812 B2 * | 2/2004 | Kaneko et al. | 318/700 |
| 6,724,168 B2 | 4/2004 | Cheong et al. | |
| 7,230,398 B2 * | 6/2007 | Miyauchi | 318/400.01 |

OTHER PUBLICATIONS

E. Capecchi, et al. "Position Sensorless Control of Transverse-Laminated Synchronous Reluctance Motors", IEEE, 2000, pp. 1766-1773.

* cited by examiner

*Primary Examiner*—Walter Benson
*Assistant Examiner*—Erick Glass
(74) *Attorney, Agent, or Firm*—Birch, Stewart, Kolasch & Birch, LLP

(57) ABSTRACT

A motor driver system includes an inverter configured to apply a three-phase voltage to a motor; an inverter driver configured to generate a reference voltage to the inverter to control a motor speed to follow a reference speed; and a motor protector configured to control the inverter driver so that a value of the reference voltage is equal to or lower than a predetermined voltage value.

14 Claims, 8 Drawing Sheets

MOTOR DRIVER SYSTEM AND METHOD FOR PROTECTING MOTOR DRIVER

This Nonprovisional application claims priority under 35 U.S.C. §119(a) on Patent Application No. 10-2007-0052270 filed in Korea on May 29, 2007, the entire contents of which are hereby incorporated by reference.

BACKGROUND OF THE INVENTION

1. Field of the Invention

The present invention relates to a motor driver system and a motor protecting method for stably controlling a motor even when the motor is driven at a high speed or is overloaded.

2. Description of the Background Art

A motor is controlled to rotate a rotor at a desired rotation speed. That is, when the speed of rotating the rotor is observed or presumed, the motor is controlled to have the presumed speed or the measured speed to follow a reference speed. An inverter driver generates a three-phase voltage for driving the motor according to a reference voltage that varies according to the reference speed. In order to generate the reference voltage, it is common to generate a reference current.

However, the reference current or the reference voltage may be higher than a predetermined threshold value when the rotor rotates at a high speed or the motor is overloaded. In this case, it becomes difficult to control the motor.

The stability is a very important factor for a driver to drive a motor as well as performance. In general, a synchronous reluctance motor denotes a unique current angle range that generates a maximum torque, obtained based on simulation results when a motor is designed. The current angle $\theta_i$ denotes an angle formed between $i_d$ and $i_q$, which are values obtained by measuring current applied to the motor and converting the measured current into a synchronous coordinate (please refer to $\theta_2$ and $\theta_2$ in FIG. 4). That is, the current angle $\theta_i$ and the current $i_d$ and $i_q$ of the motor of the synchronous coordinate have a relation described in Eq. 1.

$$\tan\theta_i = \frac{i_d}{i_q}; \quad \theta_i = \tan^{-1}\frac{i_d}{i_q}; \quad \text{Eq. 1}$$

FIG. 1 is a block diagram illustrating a system for driving a motor according to a typical current angle control scheme.

As shown in FIG. 1, the system includes a speed controller 110 for outputting a reference current value |I*| to make a presumed speed $\tilde{\omega}$ of a motor to follow a reference speed $\omega$*, a reference current generator 130 for outputting a d-axis reference current value $i_d$* and a q-axis reference current value $i_q$* using the reference current value |I*| and a reference current angle value $\theta$*, a reference voltage generator 140 for outputting $\alpha$- and $\beta$-axis reference voltage values $V_\alpha$* and $V_\beta$* in a stationary coordinate, and an inverter 150 for generating a three-phase voltage from a direct current.

The reference current generator 130 uses a fixed reference current angle value $\theta$*. The fixed reference current angle value is decided by obtaining a value providing the maximum efficiency at a rated speed. After the fixed reference current angle value is decided, the fixed reference current angle value is used regardless of a speed and a load.

In the typical control scheme using the fixed reference current angle value, a current angle is constant regardless of speeds and loads. Accordingly, a reference voltage or a reference current value higher than a threshold value may input when the motor is driven at a high speed or is overloaded. In this case, it is difficult to stably control the speed of the motor. In the worst case, the motor or the driver may be damaged.

FIG. 2 is a graph showing the speed-torque characteristics of a fan motor.

As shown in FIG. 2, a motor can output torque up to the maxim torque $T_{max}$ at a base speed $\omega_b$ because a voltage source has enough margin. However, the maximum torque that the motor can output is gradually reduced at a speed higher than $\omega_b$. In general, a current angle is obtained from a rated torque $T_{nom}$ and a rated speed $\omega_{nom}$, and the obtained current angle is constantly used in an entire speed domain.

Therefore, when the load is located at an overload point P where a speed is higher than the base speed $\omega_b$, it is difficult to control the motor stably by applying a reference voltage value higher than a threshold value to the motor. This is because the reference current is decided based on the current angle, and the reference voltage is decided according to the reference current.

SUMMARY OF THE INVENTION

Accordingly, the present invention is to solve at least the problems and disadvantages of the background art.

It is an object of the present invention to make a reference voltage to follow a preset voltage by changing a reference current angle, thereby controlling the reference voltage not to exceed a DC voltage source limitation.

Although the reference current value may be changed due to the variation of the reference current angle, the reference current value is controlled not to exceed a limitation current value. Also, it is another object of the present invention to stably control a motor by changing the current threshold value when the motor is driven at a high speed or is overloaded.

In accordance with an aspect of the present invention, a motor driver system includes an inverter configured to apply a three-phase voltage to a motor; an inverter driver configured to generate a reference voltage to the inverter to control a motor speed to follow a reference speed; and a motor protector configured to control the inverter driver so that a value of the reference voltage is equal to or lower than a predetermined voltage value.

In accordance with another aspect of the present invention, a motor driver system includes a speed controller configured to output a reference current value to control a motor speed to follow a reference speed; a reference current generator configured to output a d-axis reference current value and q-axis reference current value using the reference current value and a preset reference current angle value; a reference voltage generator configured to output reference voltages and to control a d-axis current and a q-axis current of the motor to follow the d-axis reference current and the q-axis reference current values; and a motor protector configured to change a reference current angle value so that a reference voltage value is substantially equal to a preset voltage value when the reference voltage value is larger than the preset voltage value.

In accordance still another aspect of the present invention, a method for controlling a motor driver includes generating a reference voltage to control a motor speed to follow a reference speed; sensing the reference voltage; and controlling the reference voltage value so that the reference voltage value is equal to or lower than a predetermined voltage value.

BRIEF DESCRIPTION OF THE DRAWINGS

The invention will be described in detail with reference to the following drawings in which like numerals refer to like elements.

DETAILED DESCRIPTION OF ILLUSTRATED EMBODIMENTS

The embodiments of the present invention will be described in a more detailed manner with reference to the drawings.

Hereinafter, a motor driver system and a method for protecting a motor according to embodiments of the present invention will be described with reference to the accompanying drawings.

Figure 1:
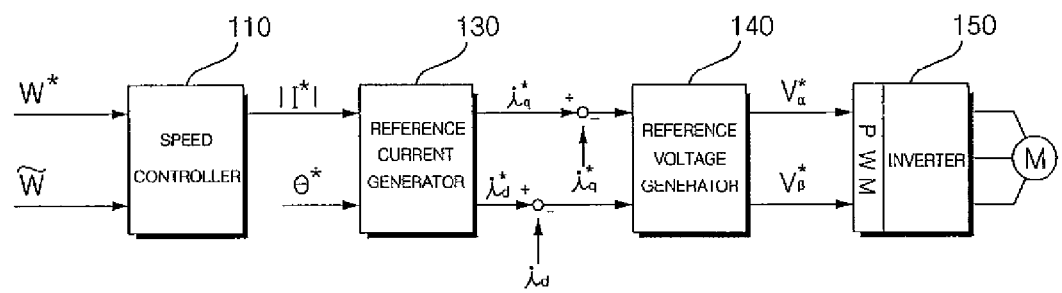
FIG. 1 is a block diagram illustrating a typical motor driver system using a current angle control scheme.
Figure 2:
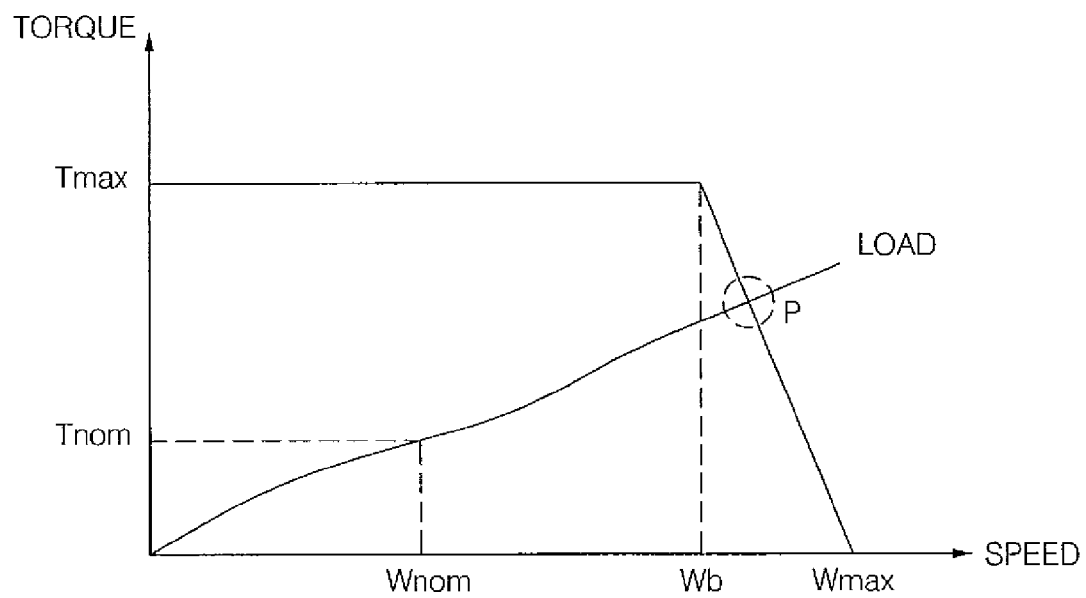
FIG. 2 is a graph showing a speed-torque characteristic of a motor.
Figure 3:
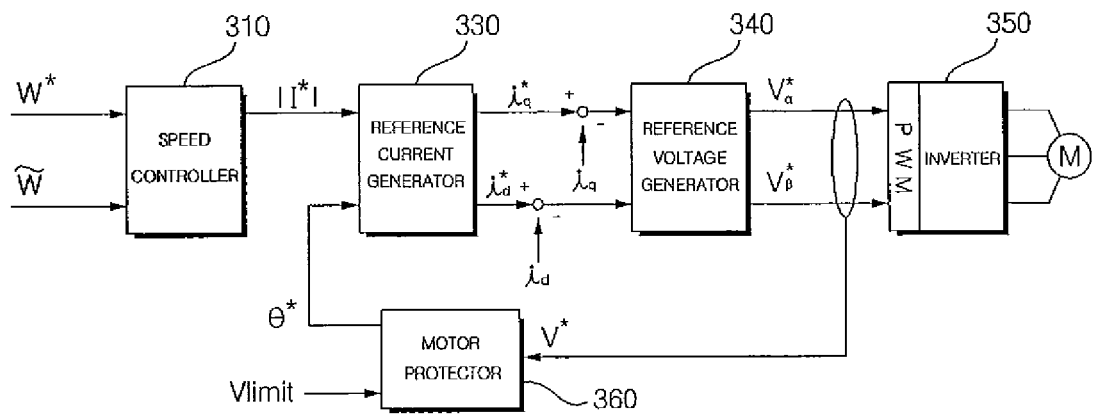
FIG. 3 is a block diagram illustrating a motor driver system including a motor protector for controlling a reference voltage value not to exceed a voltage threshold value according to an embodiment of the present invention.

FIG. 3 is a block diagram illustrating a motor driver system including a motor protector for controlling a reference voltage value not to exceed a voltage threshold value according to an embodiment of the present invention.

Referring to FIG. 3, a speed controller 310 outputs a reference current value |I*| that makes a difference between a reference speed $\omega^*$ and a presumed speed $\tilde{\omega}$ be zero (0). For example, the presumed speed $\tilde{\omega}$ may be obtained using a sensor-less algorithm. If the presumed speed $\tilde{\omega}$ is obtained through a sensor such as Hall IC, the speed controller 310 outputs a reference current value that can make the difference of a measured speed, instead of the presumed speed, and a reference speed be zero (0). The reference current generator 330 outputs a d-axis reference current value $i_d^*$ and a q-axis reference current value $i_q^*$ using the reference current value |I*| and a reference current angle value $\theta^*$. Then, the difference between the reference current value |I*| and the real currents $i_d$ and $i_q$ are inputted to the reference voltage generator 340. The reference voltage generator 340 outputs $\alpha$- and $\beta$-axis reference voltage values $V_\alpha^*$ and $V_\beta^*$ of a stationary coordinate corresponding to the difference. The inverter 350 receives the reference voltages $V_\alpha^*$ and $V_\beta^*$ and drives the motor by generating a three-phase voltage from a direct current.

The motor protector 360 observes a voltage V* applied to a motor and compares the observed voltage with a DC voltage source limitation value $V_{limit}$ to determine whether the observed voltage exceeds the DC voltage source limitation value. That is, the voltage V* applied to the motor is compared with a preset voltage $V_{limit}$ to determine whether it exceeds the preset DC voltage $V_{limit}$. When the voltage V* exceeds the preset voltage, the motor protector 360 changes the reference current angle value $\theta^*$ to set a reference voltage to be the present voltage $V_{limit}$. The voltage V* applied to the motor can be obtained by sensing the output of the reference voltage generator. In the alternative, the level of the voltage V* can be measured using Eq. 2.

$$V^* = \sqrt{(v_\alpha^*)^2 + (v_\beta^*)^2}$$ Eq. 2

Figure 4:
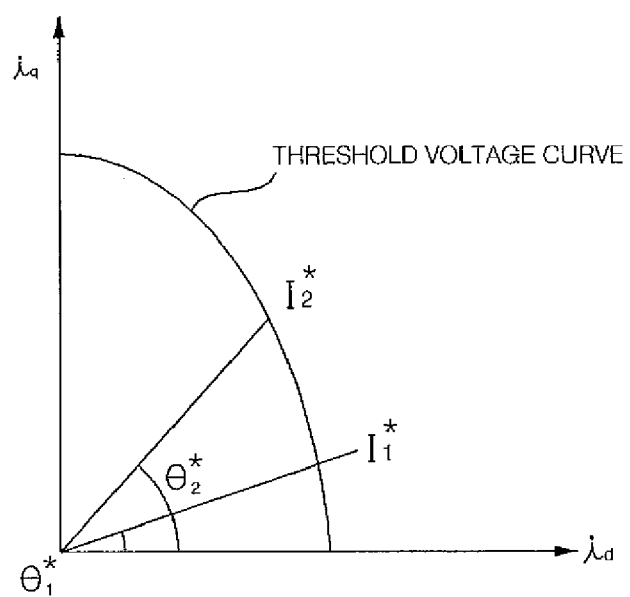
FIG. 4 is a graph illustrating a current and voltage threshold curve.

In an embodiment of the present invention, the motor protector 360 increases the reference current angle value from $\theta_1^*$ to $\theta_2^*$ to set a reference voltage to be the threshold voltage $V_{limit}$ when the reference voltage V* exceeds the threshold voltage $V_{limit}$. As a result, the d- and q-axis currents are located within a threshold voltage curve of FIG. 4. That is, the combination of the d- and q-axis currents changes from $I_1^*$ to $I_2^*$. Therefore, the motor can be stably controlled while the voltage applied to the motor is sustained as the threshold voltage $V_{limit}$.

If the reference current angle value $\theta^*$ exceeds the maximum controllable angle value, the motor becomes unstable because the motor is driven reversely or the current ripple becomes greater. Therefore, the reference current angle value may not exceed the maximum threshold angle. The maximum threshold angle may be decided based on simulation results such as motor characteristics. In general, it is preferable to set the maximum threshold angle in a range from about 83° to about 93°. The motor protector 360 increases the reference current angle value within a range that dose not generate ripple in the d- and q-axis reference currents.

Figure 5:
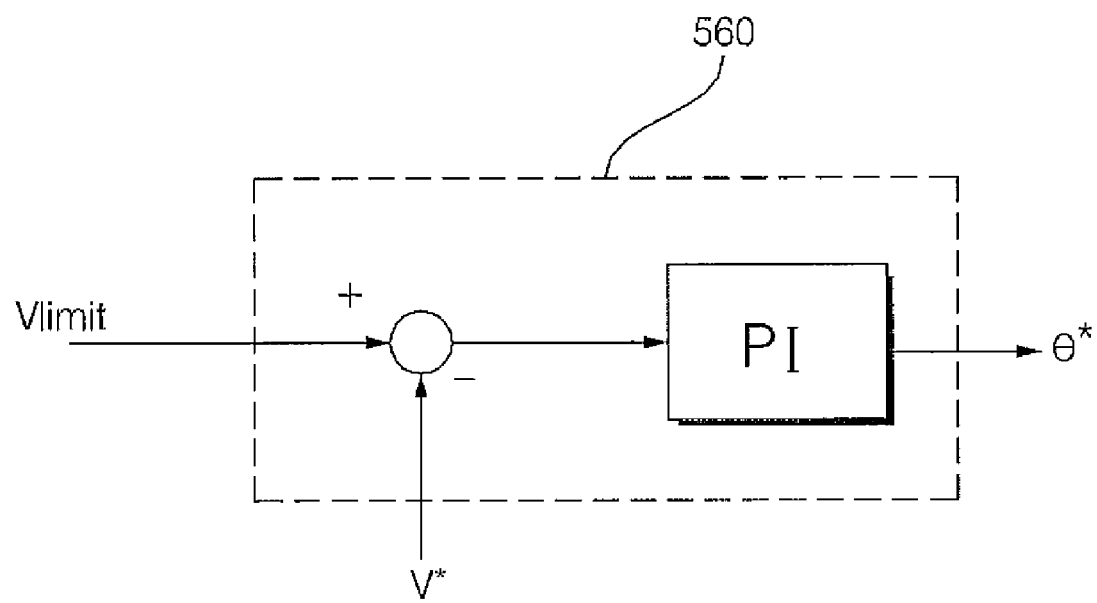
FIG. 5 is a block diagram illustrating a motor driver system for controlling a reference voltage to follow a voltage threshold according to an embodiment of the present invention.

FIG. 5 is a block diagram illustrating the motor protector 360 of FIG. 3, which controls a reference voltage to follow a threshold voltage. When the voltage applied to the motor exceeds the DC voltage limitation value $V_{limit}$ because the motor is driven at a high speed or is overloaded, the motor protector increases the reference current angle value to reduce a difference between the reference voltage V* and the threshold voltage $V_{limit}$ to be zero (0) through a proportional integral (PI) controller. That is, the motor protector 360 increases the stability of controlling the motor by maximizing the voltage applied to the motor.

Figure 6:
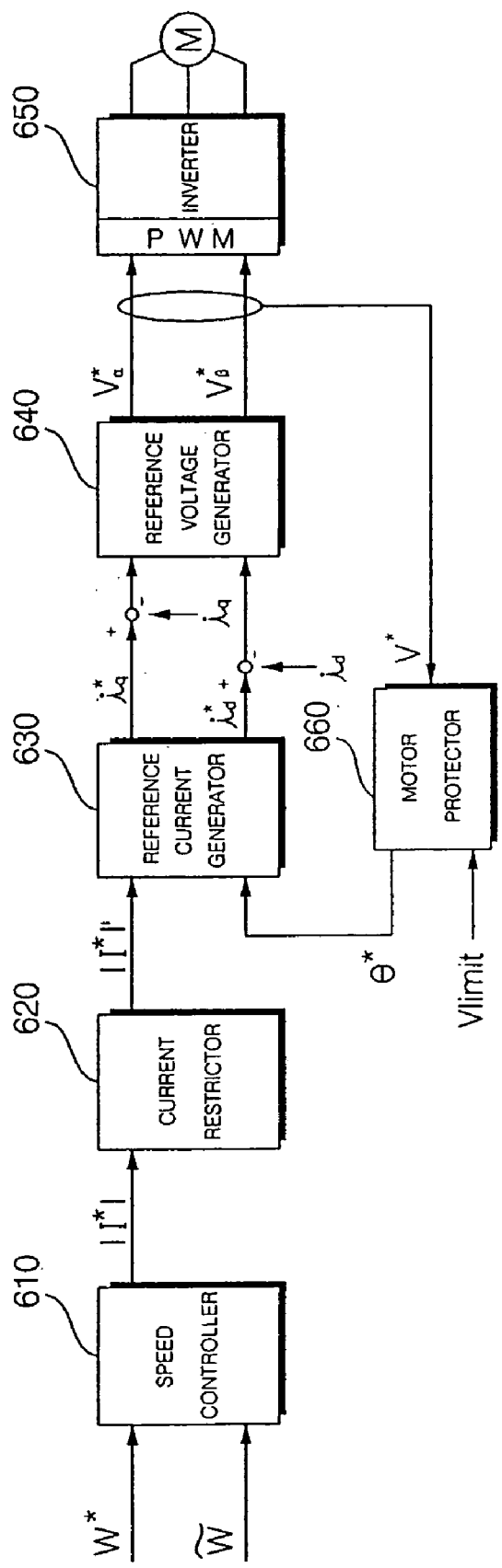
FIG. 6 is a block diagram illustrating a motor driver system for controlling a reference current value not to exceed a threshold current according to an embodiment of the present invention.
Figure 7:
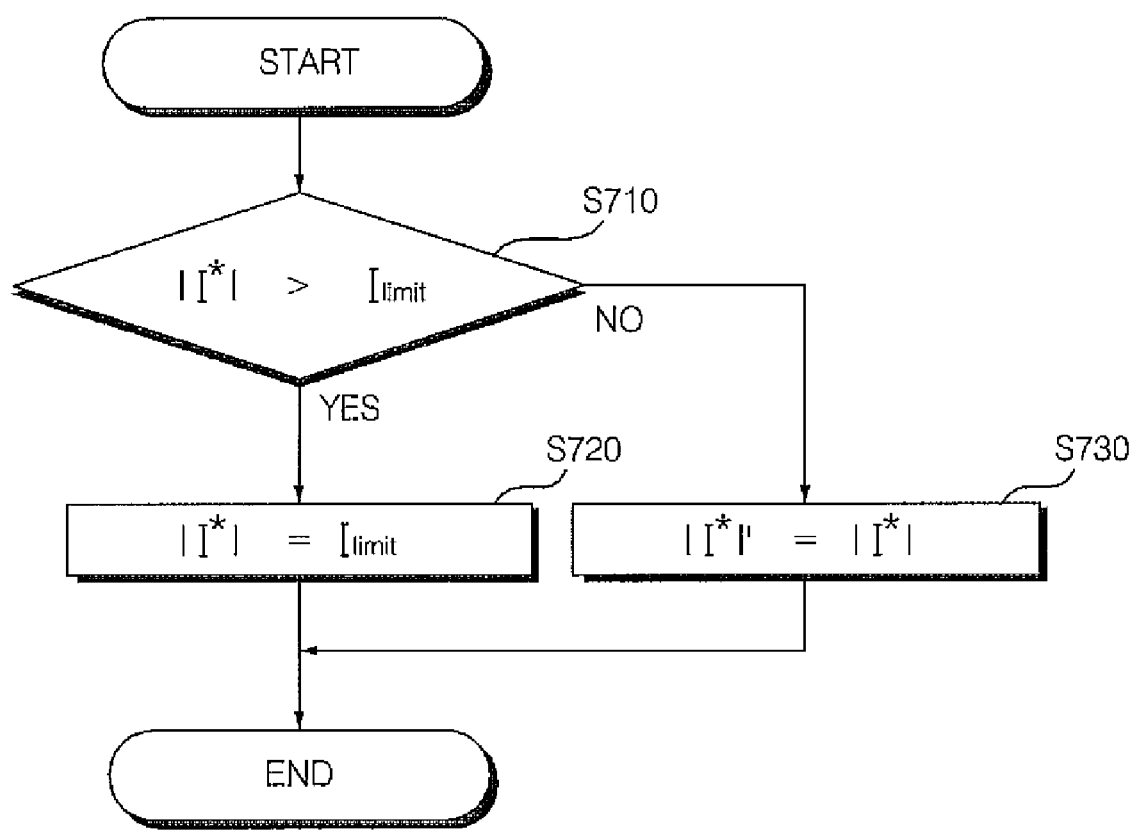
FIG. 7 is a flowchart illustrating a driving method of a current restrictor according to an embodiment of the present invention.

FIG. 6 is a block diagram illustrating a motor driver system for controlling a reference current value |I*| not to exceed a threshold current $I_{limit}$, a preset current, according to another embodiment of the present invention, and FIG. 7 is a flowchart illustrating a driving method of a current restrictor according to an embodiment of the present invention.

The current threshold value $I_{limit}$ refers to a current level such that the motor cannot generate more output even if the current is higher than the current threshold value $I_{limit}$. When the motor protector 660 increases the current angle, the current applied to the motor increases, too. In case of a small capacity motor such as a fan motor, if the current higher than a predetermined current level is applied to the motor, the motor is saturated and cannot generate more output. Therefore, the speed control of the motor becomes unstable. The current restrictor 620 receives a reference current value |I*| from the speed controller 610 and compares the received reference current value |I*| with the current threshold value $I_{limit}$ at step S710. If the reference current value |I*| exceeds the current threshold value $I_{limit}$ at step S710, the current restrictor 620 changes the reference current value |I*| to be the current threshold value $I_{limit}$ at step S720 and sends the changed reference current value (i.e., the current threshold value $I_{limit}$) to the reference current generator 630. If the reference current value |I*| does not exceed the current threshold value $I_{limit}$, the reference current value |I*| is sent to the reference current generator 630. The reference voltage generator 640 generates a reference voltage according to the inputted reference current, and the inverter 650 generates a three-phase voltage according to the generated reference voltage to drive the motor.

If necessary, a plurality of current threshold values are preset according to different current angles. In addition, a current threshold value can be alternatively changed according to the changed current angles.

Figure 8:
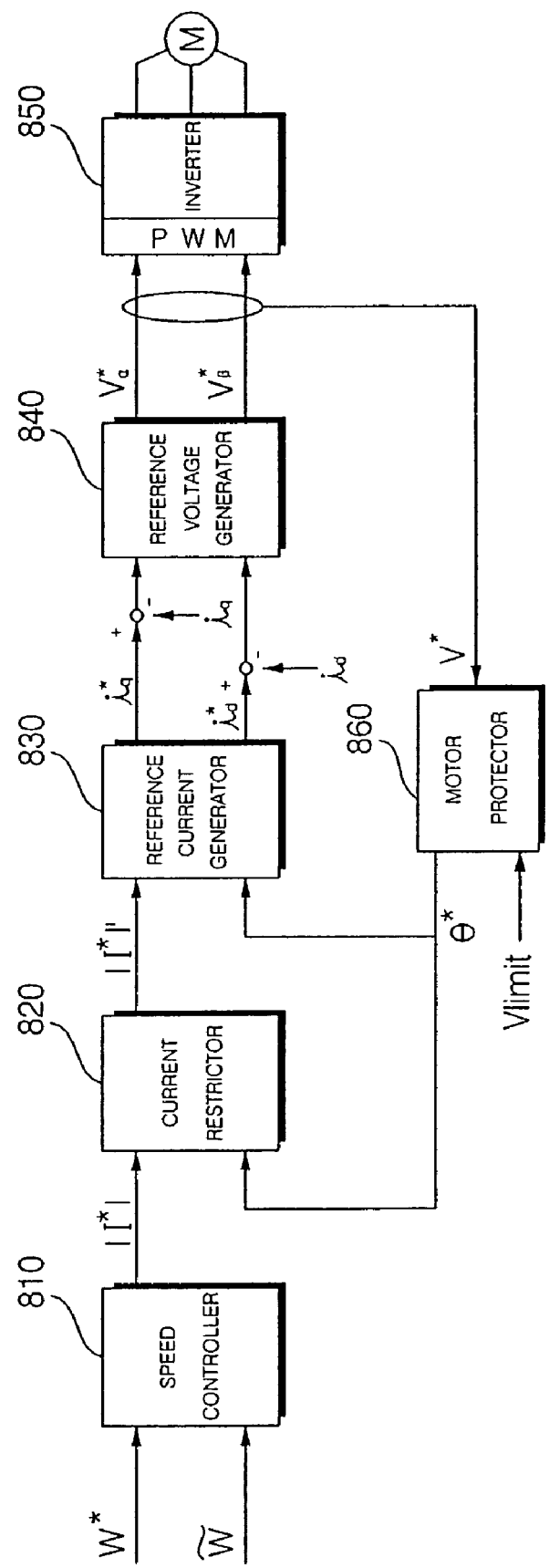
FIG. 8 is a block diagram illustrating a motor driver system according to an embodiment of the present invention.
Figure 9:
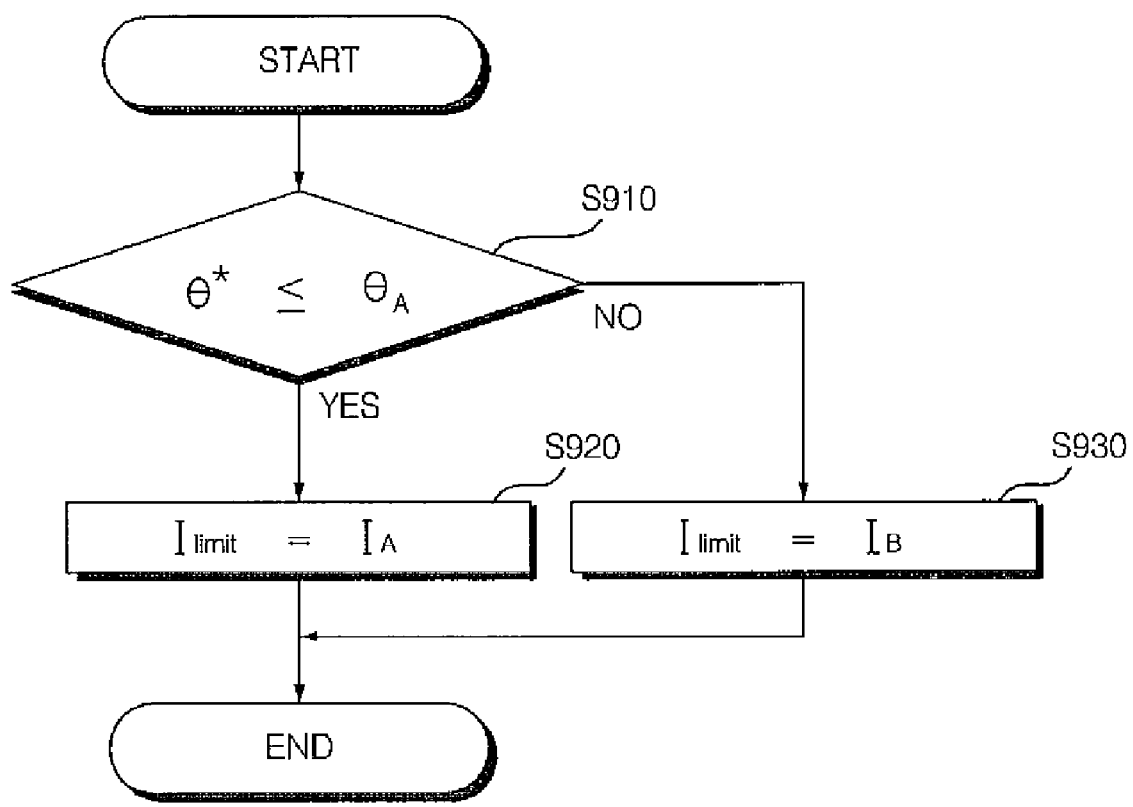
FIG. 9 and FIG. 10 are flowcharts illustrating a method of controlling a motor driver according to an embodiment of the present invention.

FIG. 8 is a block diagram illustrating a motor driver system for changing a current threshold values $I_{limit}$ according to a reference current angle value θ* according to another embodiment of the present invention, and FIG. 9 is a flowchart illustrating a controlling method thereof.

The current threshold value $I_{limit}$ refers to a current level such that the motor cannot generate more output even if the current is higher than the current threshold value $I_{limit}$. The current threshold value varies according to each of current angles. In general, a motor has a greater saturation current level at a larger current angle than an optimal current angle. That is, if the current angle increases, the current threshold value also increases as well as the current. Using this principle, the current restrictor 820 receives a reference current angle value θ* from the motor protector 860 and increases the current threshold value $I_{limit}$ if the reference current angle value θ* increases. In addition, the current restrictor 820 increases the reference current value |I*| up to the increased current threshold value and sends the increased reference current value to the reference current generator 830. The reference voltage generator 840 generates a reference voltage according to an inputted reference current and outputs the generated reference voltage to the inverter 850.

The current restrictor 820 compares a reference current angle value θ* with a preset current angle value $θ_A$ at step S910. If the reference current angle value θ* is smaller than or equal to the present current angle value $θ_A$, the current restrictor resets a current threshold value $I_{limit}$ to a current value $I_A$ according to a current angle of a rate speed—rated torque at step S920. If the reference current angle value θ* is larger than the present current angle value $θ_A$, the current restrictor resets a current threshold value $I_{limit}$ to a current value $I_B$ which increases from the current value $I_A$ at step S930.

Figure 10:
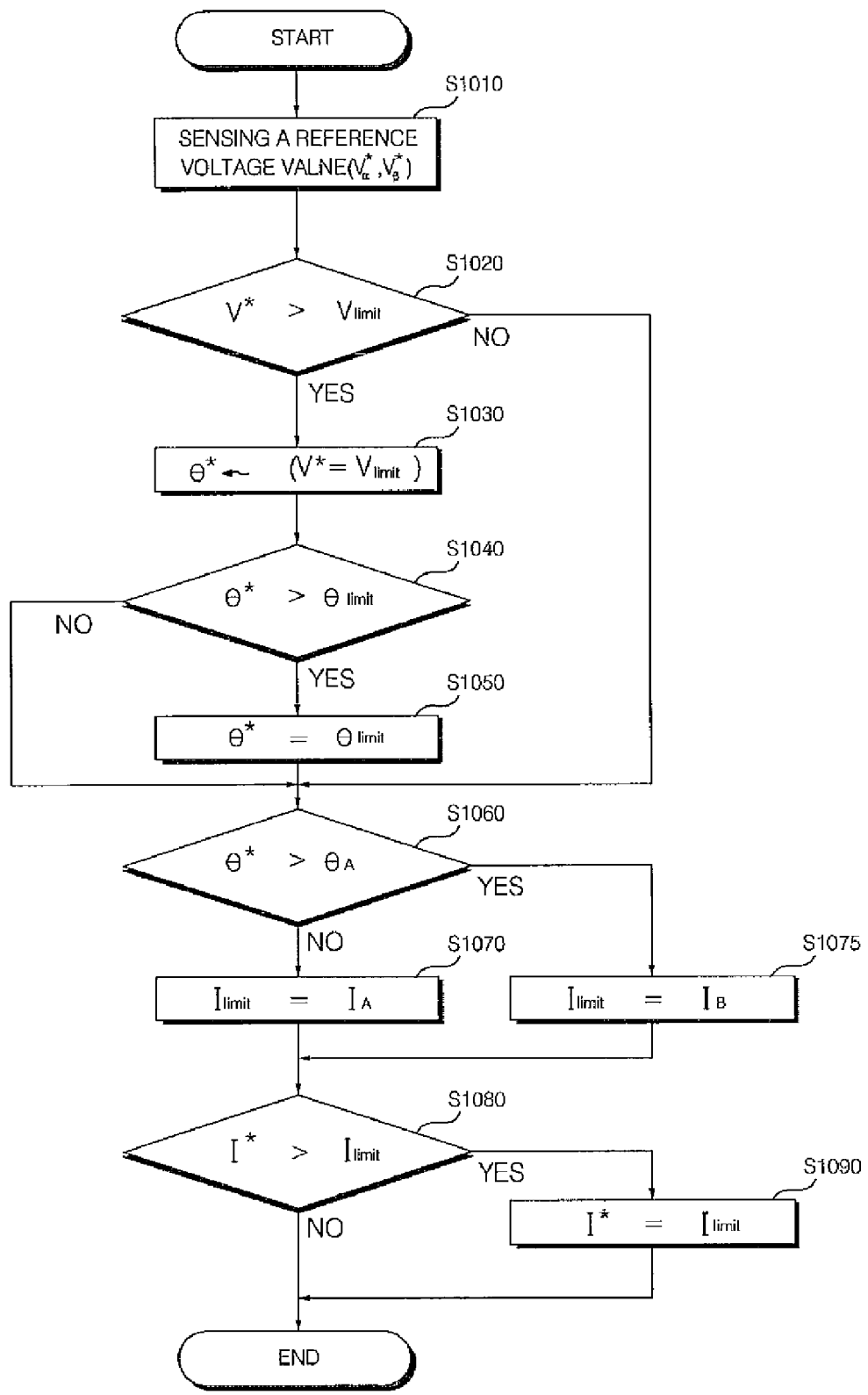

FIG. 10 is a flowchart illustrating a method of controlling a motor not to exceed a voltage threshold or a current threshold according to an embodiment of the present invention. Hereinafter, the controlling method according to the present embodiment will be described with reference to FIG. 8 and FIG. 10.

A motor protector 860 senses a reference voltage value V* at step S1010. The motor protector 860 compares the sensed reference voltage value V* with a voltage threshold value $V_{limit}$ at step S1020. There is a limitation of a voltage applied to the system. If a voltage higher than the voltage threshold is applied to the system, it becomes difficult to control the motor. If the reference voltage exceeds the threshold voltage, the reference voltage needs to be reduced to below the threshold voltage. That is, the motor protector 860 controls the degree of the current angle θ* to control the reference voltage at step S1030 if the reference voltage value exceeds the threshold voltage $V_{limit}$. If the current angle increases too much and becomes greater than a threshold angle, the rotation of the motor becomes reversed or it becomes difficult to control the motor. Therefore, the current angle must be controlled within a threshold angle $θ_{limit}$. Therefore, the motor protector 860 compares the controlled current angle with a preset threshold angle at step S1040, and set the current angle to be the threshold angle $θ_{limit}$ at step S1050 if the controlled current angle exceeds the threshold angle $θ_{limit}$. However, if the threshold angle is smaller than threshold angle $θ_{limit}$, the controlled current angle is sustained.

The amplitude of the threshold current varies according to the current angle. If the current angle is controlled, the motor can produce the maximum output by resetting the current threshold value according to the current angle. In the present embodiment, threshold current values $I_A$ and $I_B$ are preset according to different current angles. The current threshold value can be decided according to the current angle value $θ_A$ assigned to the controlled or sustained current angle.

If the controlled or sustained current angle is smaller than $θ_A$, the current threshold value is set to be $I_A$. If the controlled or sustained current angle is larger than $θ_A$, the current threshold value is set to be $I_B$. In this case, the current restrictor 820 confirms whether the controlled or sustained current angle exceeds the stored current angle $θ_A$ or not at step S1060.

If the controlled or sustained current angle exceeds the stored current angle $θ_A$, the current restrictor 820 sets the current threshold value as $I_B$ at step S1075.

If the controlled or sustained current angle is smaller than the stored current angle $θ_A$, the current restrictor 820 sets the current threshold value as $I_A$ at step S1070.

Then, the current restrictor 820 checks whether the reference current value exceeds the current threshold value or not at step S1080.

If the reference current value exceeds the current threshold value, the current restrictor 820 changes the reference current value to be the current threshold value at step S1090. If not, the reference current value is sustained.

If the reference current value exceeds the current threshold, it becomes difficult or unstable to control a motor. Accordingly, the current restrictor 820 compares the reference current value with the current threshold value at step S1080. If the reference current value exceeds the current threshold, the current restrictor 820 changes the set the reference current value to be the current threshold value at step S1080.

The foregoing exemplary embodiments and aspects of the invention are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

As described above, the motor driver system according to some embodiments of the present invention measures a voltage applied to the motor and increase a current angle if the measure voltage exceeds a voltage threshold, and changes a reference current value according to the changed current angle. Therefore, the stability of controlling a motor is improved although the motor is driven at a high speed or is overloaded.

Also, the motor driver system according to some embodiments of the present invention enables the motor to use the maximum voltage and current to drive, thereby improving the performance thereof.

What is claimed is:

1. A motor driver system comprising:
an inverter configured to apply a three-phase voltage to a motor;
an inverter driver configured to generate a reference voltage to the inverter to control a motor speed to follow a reference speed; and a motor protector configured to control the inverter driver so that a value of the reference voltage is equal to or lower than a predetermined voltage value, wherein the inverter driver includes:
- a speed controller configured to generate a reference current value to control the motor speed to follow the reference speed;
- a reference current generator configured to generate a d-axis reference current and a q-axis reference current using the reference current value and a reference current angle value; and
- a reference voltage generator configured to generate the reference voltage to control a d-axis current and a q-axis current of the motor to follow the d-axis reference current and q-axis reference current, and wherein the motor protector changes a reference current angle value of the reference current generator when the reference voltage value is larger than the predetermined voltage value.

2. The motor driver system as claimed in claim 1, wherein the motor protector increases the reference current angle value within a predetermined range without generating a ripple at the d-axis reference current and the q-axis reference current.

3. The motor driver system as claimed in claim 1, further comprising a current restrictor configured to generate a threshold value of a reference current value as an amplitude of the reference current and to output the generated threshold value to the reference current generator.

4. The motor driver system as claimed in claim 3, wherein the threshold value of the reference current value generated from the current restrictor varies according to the reference current angle value.

5. A motor driver system comprising:
- a speed controller configured to output a reference current value to control a motor speed to follow a reference speed;
- a reference current generator configured to output a d-axis reference current value and q-axis reference current value using the reference current value and a preset reference current angle value;
- a reference voltage generator configured to output reference voltages and to control a d-axis current and a q-axis current of the motor to follow the d-axis reference current and the q-axis reference current values; and
- a motor protector configured to change a reference current angle value so that a reference voltage value is substantially equal to a preset voltage value when the reference voltage value is larger than the preset voltage value.

6. The motor driver system as claimed in claim 5, wherein the motor protector controls the reference current angle value so that the reference current angle value is variable within a predetermined threshold angle range.

7. The motor driver system as claimed in claim 5, further comprising a current restrictor configured to control a reference current value based on a current threshold value and to set the controlled reference current value to be the current threshold value when the reference current value exceeds the current threshold value.

8. The motor driver system as claimed in claim 7, wherein the current restrictor receives the reference current angle value from the motor protector and adjusts a current threshold value according to the reference current angle value.

9. The motor driver system as claimed in claim 7, wherein the current restrictor receives the reference current angle value from the motor protector, compares the reference current angle value with a preset current angle, and adjusts the current threshold value according to whether the preset current angle exceeds the reference current angle value.

10. A method for controlling a motor driver comprising:
- generating a reference voltage to control a motor speed to follow a reference speed;
- sensing the reference voltage; and
- controlling the reference voltage value so that the reference voltage value is equal to or lower than a predetermined voltage value, wherein the controlling step includes increasing a reference current angle value when the reference voltage value exceeds the predetermined voltage value.

11. The method as claimed in claim 10, wherein the reference current angle value is equal to or lower than a maximum threshold angle.

12. The method as claimed in claim 10, further comprising controlling a reference current value using a current threshold value when the reference current value increases and exceeds the current threshold value as the reference current angle value increases.

13. The method as claimed in claim 12, wherein the current threshold value changes according to the reference current value.

14. The method as claimed in claim 12, further comprising:
- comparing the reference current angle value with a preset current angle; and
- adjusting the current threshold value according to a difference of the reference current angle value and the preset current angle.

* * * * *